United States Patent [19]

Belart et al.

[11] Patent Number: 4,685,747

[45] Date of Patent: Aug. 11, 1987

[54] BRAKE SYSTEM WITH SLIP CONTROL

[75] Inventors: Juan Belart, Walldorf; Jochen Burgdorf, Offenbach-Rumpenheim; Lutz Weise, Mainz; Wolfram Seibert, Pfungstadt, all of Fed. Rep. of Germany

[73] Assignee: Alfred Teves GmbH, Frankfurt am Main, Fed. Rep. of Germany

[21] Appl. No.: 822,750

[22] Filed: Jan. 27, 1986

[30] Foreign Application Priority Data

Jan. 25, 1985 [DE] Fed. Rep. of Germany ....... 3502451

[51] Int. Cl.$^4$ ............................................... B60T 8/02
[52] U.S. Cl. ............................................ 303/114; 303/119
[58] Field of Search ................ 303/114, 119, 113, 115

[56] References Cited

U.S. PATENT DOCUMENTS 4,362,339 12/1982 Belart .................................. 303/113
4,416,491 11/1983 Belart et al. ....................... 303/113

Primary Examiner—Duane A. Reger
Assistant Examiner—Matthew C. Graham
Attorney, Agent, or Firm—James B. Raden; William J. Michals

[57] ABSTRACT

A brake system with slip control comprises a conventional braking pressure generator (1), for example a master cylinder (2) with a vacuum-type booster (3) connected before it. An auxiliary pressure control valve (23) is provided whose control inlet port (21) is connected with a pressure chamber (9) of the master cylinder. As the slip control action starts, a hydraulic pump (26) is put into operation which causes an auxiliary pressure proportional to the pedal force to be built up by means of the control valve (23). The auxiliary pressure causes hydraulically actuatable valve arrangements (27, 28, 45, 46) to be switched over and thus the auxiliary pressure supply system (23, 26) instead of the master cylinder (2) to be connected with the wheel brakes (31 to 34). Simultaneously, the brake circuits (I, II) of the master cylinder are cut off and thus a further displacement of the master cylinder pistons (6, 7) is prevented.

4 Claims, 2 Drawing Figures

BRAKE SYSTEM WITH SLIP CONTROL

BACKGROUND OF THE INVENTION

The present invention relates to a slip controlled brake system comprising a pedal-actuated, auxiliary pressure supported braking pressure generator to which the wheel brakes are connected by way of pressure medium conduits, and of a hydraulic auxiliary pressure supply system comprising a hydraulic pump, a pressure compensating and pressure medium supply reservoir, and an auxiliary pressure control valve. The system is provided with wheel sensors as well as electronic circuits for determination of the rotational behavior of the wheels and for generation of electric braking pressure control signals permitting control of electromagnetically actuatable pressure inlet and outlet valves inserted in the pressure medium conduits for slip control.

In known brake systems of this type (DE-OS 30 40 561, DE-OS 30 40 562), a master cylinder with a hydraulic brake force booster connected upstream of it is used as a braking pressure generator. The auxiliary pressure supply system comprises a hydraulic pump and a hydraulic accumulator from which, in application of the brake, an auxiliary pressure proportional to the pedal force is derived by means of a control valve. This dynamic pressure, on the one hand, is transmitted by way of the master cylinder to the static brake circuits connected to the master cylinder. On the other hand, the pressure chamber into which the pressure proportional to the pedal force is introduced is directly connected with the wheel brakes of one axle, preferably the rear axle. Further more, inlet valves are inserted in both the static circuits and the dynamic circuit for slip control, the inlet valves being normally open and permitting, in case of imminent blocking of a wheel, to interrupt the inflow of pressure medium to the respective wheel. In addition, there are outlet valves through which pressure medium can be drained, if necessary, towards the pressure compensating reservoir. As the slip control action starts, the booster chamber, in which the controlled pressure fed in from the auxiliary pressure supply system prevails, is connected by way of a so-called main valve with the static brake circuit of the master cylinder, in order to allow the volume of pressure medium drained off by way of the outlet valves to be reintroduced into the static circuits. Furthermore, the piston (or pistons) in the (tandem) master cylinder are turned or stopped, for safety reasons, by means of a positioning device. The construction expediture required for generating, accumulating, and controlling the hydraulic auxiliary pressure, for dynamic inflow into the static circuits, and for assuring the brake functions in case of failure of individual circuits is considerable.

In brake systems of this type, the signals for control of the inlet and outlet valves are generated by means of electronic circuits of which the inputs are connected with wheel sensors (e.g., inductive sensors) and are thus able to react to any change of the rotational behavior of the wheels indicating a blocking danger by maintaining, decreasing, and re-increasing the pressure at the respective wheel.

The object of the present invention, therefore, is to overcome the described disadvantages of the known slip-controlled brake systems and to develop a slip-controlled brake system which can be produced at comparatively low expense with out any loss in terms of functionability.

SUMMARY OF THE INVENTION

This object is achieved by a further development of a brake system of the type described, the improvement being that the auxiliary pressure control valve can be controlled by the braking pressure generated in the braking pressure generator, and upon commencement of the slip control action, causes an auxiliary pressure proportional to braking pressure to be built up in the auxiliary pressure supply system. The auxiliary pressure causes hydraulically actuatable valve arrangements which are inserted in the pressure medium conduits leading from the braking pressure generator to the inlet valves to be switched over. The valve arrangements are open when in idle position, and upon switching over to their second switch position hydraulically connect the auxiliary pressure supply system instead of the braking pressure generator with the inlet valves and/or the wheel brakes.

According to the present invention, a usual braking pressure generator, for example a tandem master cylinder with a vacuum-type booster connected before it, can be developed into a slip-controlled brake system by connecting an auxiliary pressure control valve and an auxiliary pressure source in combination with some additional, hydraulically actuatable and thus very simple valves. Furthermore, wheel sensors, electronic control circuits, and electromagnetically actuatable inlet and outlet valves in the pressure medium paths between the wheel brakes and the master cylinder and/or the compensating reservoir are required for completion of the system. The pressure medium source consists of a hydraulic pump which is switched on by the electronic controller generating the braking pressure control signals only as the slip control action starts.

In the event of failure of the slip control, disturbance of the pump, or any other defect of the components necessary for slip control, the brake system will remain functionable without any restriction (except for the failure of the clip control) because, contrary to the known systems described, the brake force boosting function also remains operable.

According to an advantageous embodiment of the brake system in accordance with the invention, the brake circuits or pressure medium circuits of the braking pressure generator are cut off when the valve arrangements are switched over to their second switch position. Thus, the working pistons of the master cylinder are locked, and even in unfavorable conditions the maintenance of a minimum volume of pressure medium in the working chambers of the master cylinder is assured.

According to a further embodiment of the invention, the hydraulically actuatable valve arrangements are designed as two-way/two-position directional control valves which are inserted in the pressure medium conduits from the braking pressure generator to the inlet valves and, while being open when in idle position, cut off when switched over, the outlets of said two-way/two-position directional control valves each being connected by way of a check valve opening towards the inlet valve with the auxiliary pressure supply system.

On the other hand, it is also possible within the scope of the invention to realize the valve arrangements by means of three-way/two-position directional control valves hydraulically connecting the wheel brakes, when in idle position, with the braking pressure generator and, upon switching over, with the auxiliary pressure supply system, the third path or connection in each case being locked.

As an alternative or in addition to the locking of the master cylinder by non-return valves, a further embodiment in accordance with the invention provides that the master cylinder is equipped with a positioning device comprising a piston guided in the master cylinder and pressure chamber into which, as the slip control action starts, pressure medium can be introduced by way of the auxiliary pressure control valve, thus permitting the working pistons of the master cylinder to be stopped or returned to a predetermined position.

In other embodiments of the present invention it is advantageous to have the pressure connection or pressure medium conduit of the auxiliary pressure supply systems communicate with the pressure compensating reservoir by way of an electromagnetically actuatable two-way/two-position directional control valve which is locked when idle and can be switched over to open passage.

A further, advanced embodiment of the present invention provides that between the control conduit of the auxiliary pressure control valve and the pressure connection or pressure medium conduit of the auxiliary pressure supply system a differential pressure recognition device is inserted which electrically and/or hydraulically generates an output signal indicating the pressure differential. The signal can be evaluated for monitoring the system, for signaling defects, and/or for cutting off the slip control on occurrence of a fault. For this purpose, it is expedient that the signal is fed to the electronic controller by means of which the inlet and outlet valves are controlled in dependence on the rotational behavior of the individual wheels.

BRIEF DESCRIPTION OF THE DRAWING

Further features, advantages, and application of the present invention will be apparent from the following description of the embodiment with reference to the accompanying drawing wherein.

DETAILED DESCRIPTION

Figure 1:
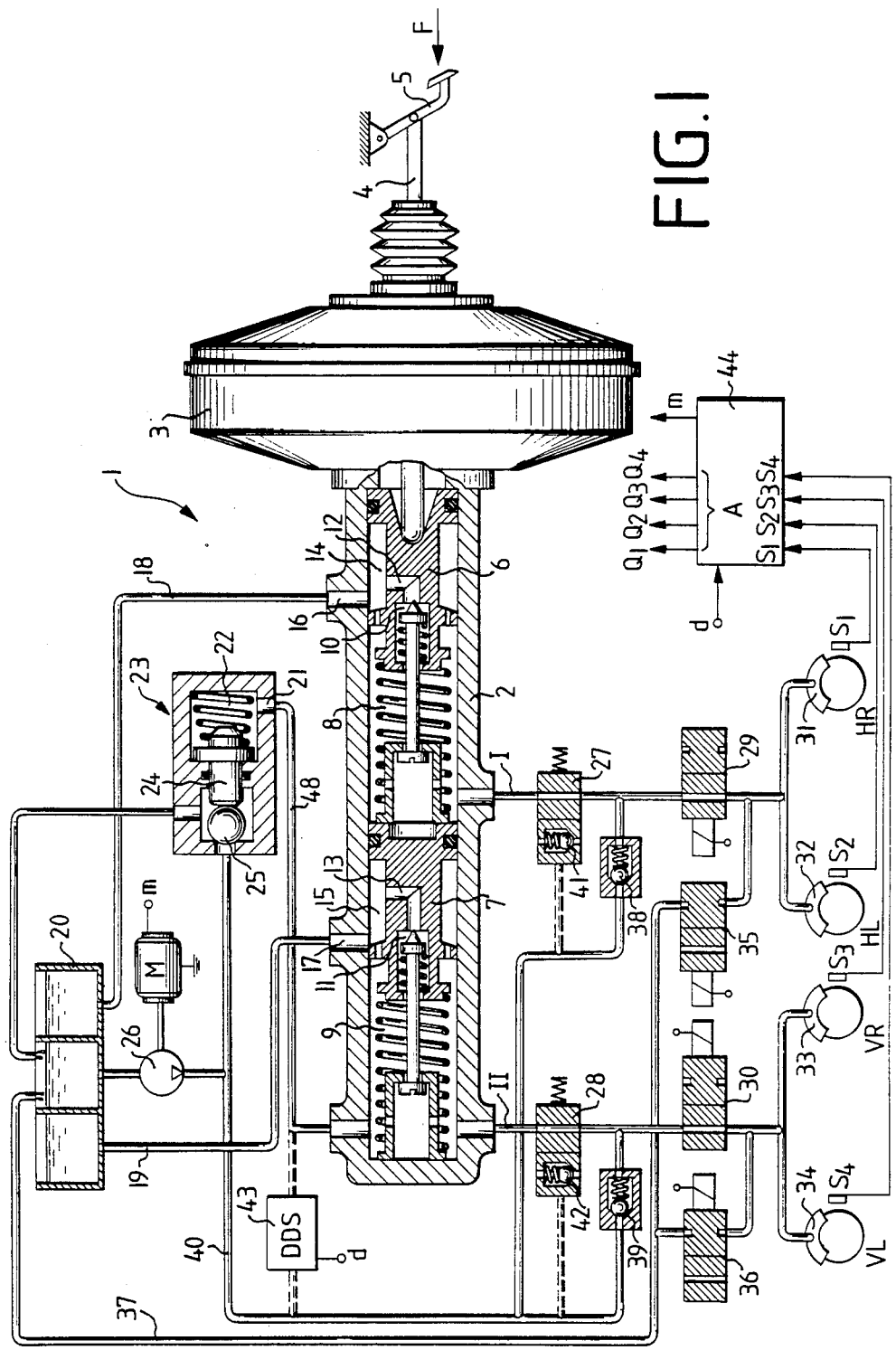
FIG. 1 is a simplified, partly sectional, partly purely diagrammatic view of the most important components of a slip-controlled brake system according to an embodiment of the present invention; and, FIG. 2 shows, in a view similar to FIG. 1 a further embodiment of the invention, without the purely electric or electronic components and switches.

In the embodiment illustrated in FIG. 1, the brake system as proposed by the present invention comprises as braking pressure generator 1 a hydraulic unit consisting substantially of a tandem master cylinder 2 with a vacuum-type booster 3 connected before it. By means of a push rod 4 the pedal force F applied to the brake pedal 5 is transmitted in a known manner to be vacuum-type booster 3 and from there, supported by auxiliary pressure, to the working pistons 6 and 7 of the tandem master cylinder 2.

When the brake is in released position as shown in the drawing, the pressure chambers 8, 9 of the master cylinder communicate by way of open central valves 10, 11, connecting passages 12, 13 inside the pistons 6, 7 and finally by way of annular chambers 14, 15 connecting bores 16, 17 and hydraulic conduits 18, 19 with a pressure compensating and pressure medium supply reservoir 20.

One of the two pressure chambers (here pressure chamber 9) communicates by way of the control inlet port 21 with the control chamber 22 of an auxiliary pressure control valve 23. By means of a piston 24 inside the control valve 23 the control pressure is transmitted to a ball seat valve 25 which is hydraulically connected to the pressure side of a hydraulic pump 26 on one side and on the other to the pressure compensating reservior 20. The suction side of the pump 26 also communicates with the reservoir 20. The pump is a hydraulic pump driven by an electric motor (M). The electric connections "m" and "ground" are also indicated symbolically.

The two brake circuits I, II of the master cylinder 2 are connected with two wheel brakes 31, 32; 33, 34 each, by way of hydraulically actuatable valves 27, 28 which are open when unpressurized, and by way of electromagnetically actuatable valves, so-called inlet valves 29, 30 which are also open when in idle position. The wheel brakes 31, 32 or 33, 34 respectively, which are connected in parallel, can be allocated, as shown here by way of example, to the wheels of one axle (rear wheels HR, HL, front wheels VR, VL) or to the diagonals. The wheel brakes are connected to electromagnetically actuatable outlet valves 35, 36 which are closed when idle and communicate with the pressure compensating reservoir 20 by way of a hydraulic return flow conduit 37.

The brake circuits I, II are connected each by way of a check valve 38, 39 and by way of a connecting conduit 40 with the auxiliary pressure supply system—i.e., the hydraulic pump 26 and the auxiliary pressure control valve 23. The check valves 38, 39 open as soon as the auxiliary pressure increases by a specific value above the pressure prevailing at any moment in the brake circuits I, II between the inlet valves 29, 30 and the valves 27, 28. The auxiliary pressure also causes the valves 27, 28 to switch over to a second switch position in which the pressure medium flow is interrupted or, as in the embodiment shown in FIG. 1, only a pressure decrease towards the braking pressure generator 1 is possible; for this purpose, check valves 41, 42 are connected parallel to the valves 27, 28 or combined with these valves in a single unit.

Between the supply conduit 40 of the auxiliary pressure supply system (23, 26) and the hydraulic conduit 48 loading from the pressure chamber 9 to the control inlet port 21 of the control valve 23, a differential pressure recognition device 43 is inserted. An electrical signal allowing the existence of a differential pressure to be recognized and evaluated is applied to the connection d of the device 43.

The vehicle wheel are equipped with inductive sensors $S_1$ to $S_4$ which cooperate with a toothed disc running synchronously with the wheel rotation and generate electrical signals indicating the rotational behavior of the wheel—i.e., the wheel speed and changes. These signals are transmitted via the inputs $s_1$ to $s_4$ to an electronic signal processing and combining circuit 44 which generates braking pressure control signals which in turn, as a blocking tendency is recognized, cause the inlet and outlet valves 29, 30, 35, 36 to be switched over temporarily and thus the braking pressure to be maintained, decreased, and in due time increased again. For this purpose the solenoids of the inlet and outlet valves are actuated by way of the outputs $a_1$ to $a_4$; the electric connecting lines between the outputs $a_1$ to $a_4$ and the coils of the valves 20, 30, 34, 35 are not shown in FIG. 1 for reasons of simplification. For the circuits 44, prewired circuits or programmable electric components, such as microcomputers or microcontrollers, may be used.

In generation of the braking pressure control signals, the switch condition of the differential pressure recognition circuit and further signals, if any, are additionally evaluated. For this purpose the signal input d is provided. The signal for starting the drive motor of the hydraulic pump 26, which only operates during a slip control action, is applied by way of the input m to the motor M.

The brake system as illustrated in FIG. 1 functions as follows:

On actuation of the brake, the pedal force F, supported by the vacuum in the booster 3, in transmitted to the master cylinder pistons 6, 7. The central valves 10, 11 close so that braking pressure can now be generated in the pressure chambers 8, 9 and thus in the brake circuits I, II and will be transmitted by way of the valves 27, 29 and 28, 30, respectively, to the wheel brakes 31, 32 and 33, 34.

The pressure in the chamber 9 in transmitted to the control inlet port 21 and to the control chamber 22 of the control valve 23 and increases the closing force of the seat valve 25 exerted by the indicated spring. However, this will have no effect since at this stage the hydraulic pump 26 is not yet in operation.

In the event of a blocking tendency now being detected at one or several wheels by means of the sensors $S_1$ to $S_4$ and the circuit 44, the slip control action will start. The drive motor M of the pump 26 will switch on so that in the auxiliary pressure supply system and the conduit 40 an auxiliary pressure proportional to the pressure prevailing in the control chamber 22 and/or in the pressure chamber 9 and thus to the pedal force F can be generated.

The auxiliary pressure will cause the hydraulically actuatable valves 41, 42 to switch over and thus to cut off the brake circuits I, II to switch over and thus to cut off the brake circuits I, II. Further displacement of the master cylinder pistons 6, 7 in the direction of the pedal force F as well as a draining of the pressure chambers 8, 9 is prevented. As soon as sufficient pressure is built up, the auxiliary pressure supply system will take over the function of the braking pressure generator 1 by means of the supply conduit 40 and the check valves 38, 39 which now open. Through the check valves 38, 39 pressure medium will dynamically flow into the brake circuits I, II. The actual course of the braking pressure in the wheel brakes 31-34 is determined by the inlet and outlet valves 29, 30, 35, 36 which received slip-controlling braking pressure control signals by way of the lines $a_1$ to $a_4$.

The comparison between the pressure prevailing in the pressure chamber 9 of the master cylinder and in the conduit 48 leading to the auxiliary pressure control valve 23 and the auxiliary pressure generated from time to time by the pump 26 and the control valve 23, taking account of the operating condition (i.e., normal braking or actuation of the slip control) enables defects of any kind to be recognized in a reliable manner. During braking without slip control, pressure must be generated in the pressure chamber 9, but not in the auxiliary pressure supply system. A breakdown of the brake circuit II (e.g., due to a leakage) can thus be detected by means of the differential pressure recognition device 43. On commencement of the control, the pressure differential in an intact system will be low or tend towards zero. In case of a failure or disturbance of the pump 26 or the control valve 23, a fault in the starting cycle of the motor M or the like, an overpressure will remain in the pressure chamber 9 as compared to the auxiliary pressure supply conduit 40 even upon commencement of the slip control action. Thus, by logically combining this and other conditions by means of the circuit 44, faults can be detected and signaled. Depending on the kind of fault, the circuit 44 will then automatically switch off the slip control completely or partially (i.e., limited to some wheel brakes) in order to ensure that an effective braking operation remains possible by way of the intact brake circuit.

In a further embodiment of the invention (not shown) the output signals of the differential pressure recognition device 43 indicate on which side the pressure is higher due to a defect, which allows inference of the type of fault. Furthermore, it is advantageous in some applications to generate by means of the recognition device 43 a hydraulic signal which depends on the pressure comparison and to use this signal on occurrence of a fault to interrupt the slip control or not to release it.

Figure 2:
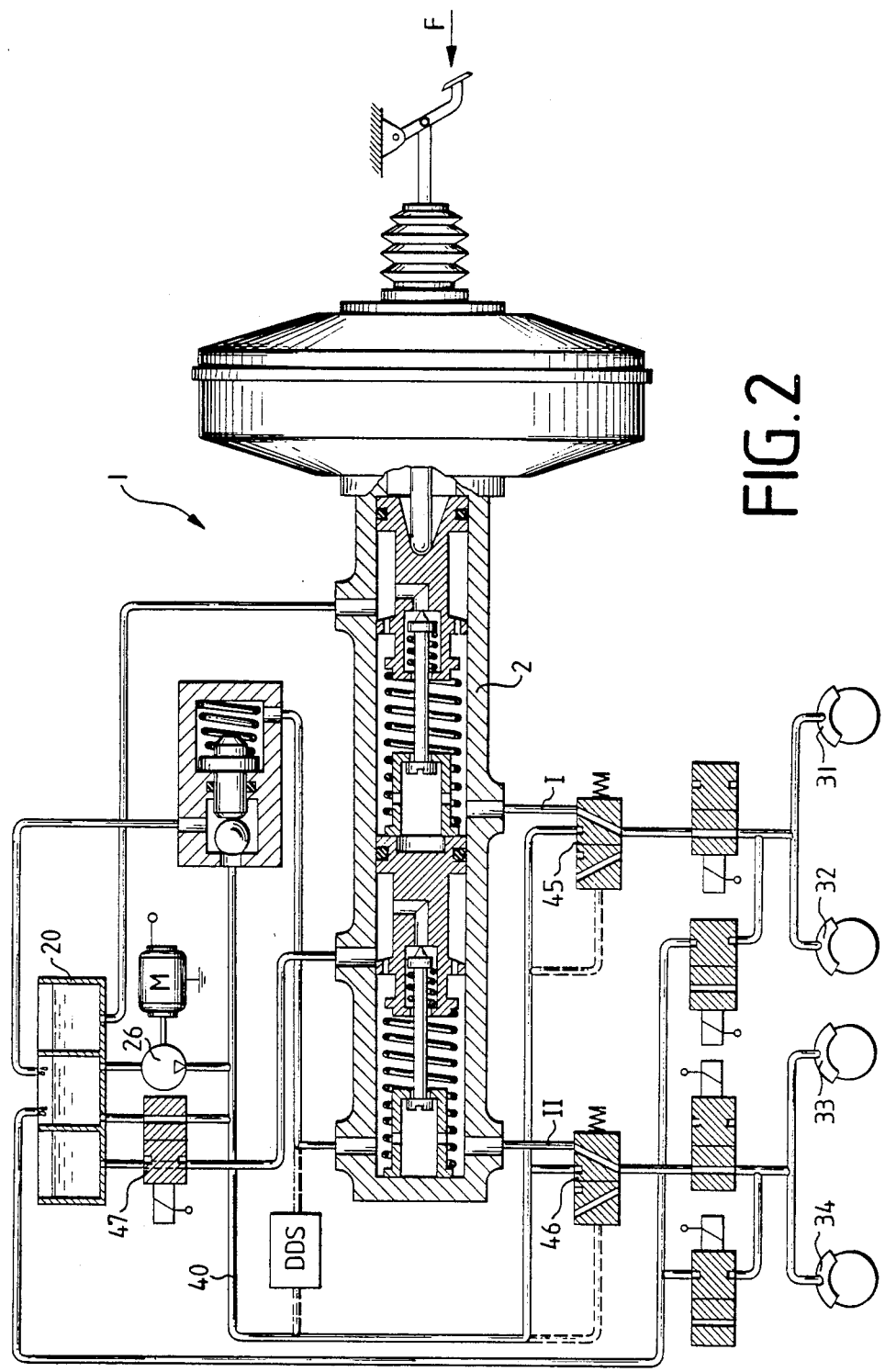

In the embodiment of the invention shown in FIG. 2, the auxiliary pressure is transmitted by way of the supply conduit 40 by means of hydraulically actuatable three-way/two-position directional control valves 45, 46 instead of the braking pressure generator 1 to the wheel brakes 31-34 and/or to the inlet port of the respectively inlet valves 29, 30. When the valves 45, 46 are in their second switch position, the pressure chambers 8, 9 and/or the brake circuits I, II are locked whereby a further displacement of the master cylinder pistons 6, 7 is prevented.

Furthermore, the brake system according to FIG. 2, comprises an electromagnetically actuatable two-way/two-position directional control valve 47 which in its idle position is open and directly connects the auxiliary pressure supply conduit 40 with the pressure compensating reservoir 20. Before switching on of the drive motor M of the hydraulic pump 26 or simultaneously with the starting of said pump, the valve 47 is switched over so that auxiliary pressure can now be built up.

The valve 47 allows a very rapid decrease of the auxiliary pressure upon termination of the control as well as a rapid switching back of the hydraulically actuatable valves 45, 46 to be achieved.

What is claimed is:

1. A brake system with slip control for use with an automotive vehicle having wheel brakes, said system comprising, in combination: a pedal-actuated, auxiliary pressure supported braking pressure generator to which the wheel brakes are connected by way of pressure medium conduits; a hydraulic auxiliary pressure supply system comprising a hydraulic pump, a pressure compensating and pressure medium supply reservoir, and an auxiliary pressure control valve; wheel sensors and electronic circuits for coupling to said vehicle for determination of the wheel rotational behavior and for generation of electric braking pressure control signals permitting control of electromagnetically actuatable pressure inlet and outlet valves inserted in the pressure medium conduits for slip control; wherein the auxiliary pressure control valve (23) is controlled by the braking pressure generated within the braking pressure generator (1) and, upon commencement of the slip control action, causes an auxiliary pressure proportional to the braking pressure to be built up in the auxiliary pressure supply system (23, 26), said auxiliary pressure causing hydraulically actuatable valve arrangements (27, 28, 38, 39, 45, 46) to be switched over; said valve arrangements, which are inserted in the pressure medium conduits leading from the braking pressure generator (1) to the inlet valves (29, 39), being open when in idle position and, upon switching over to a second switch position, hydraulically connecting the auxiliary pressure supply system (23, 26) instead of the braking pressure generator (1) with the inlet valves (29, 39) and/or the wheel brakes (31–34), wherein the hydraulic pump (26) comprises a drive motor (M) which can be started as the slip control action starts, wherein the braking pressure generator (1) is designed as a tandem master cylinder (2) with a vacuum-type booster (3) connected before it, wherein a control inlet port (21) of the auxiliary pressure control valve (23) is connected with one of two brake circuits (I, II) of said tandem master cylinder (2), wherein the switching over of the valve arrangements (27, 28 45, 46) to their second switch position causes the brake circuits (I, II) or pressure medium circuits of the braking pressure generator (1) to be cut off, and wherein the hydraulically actuatable valve arrangements (45, 46) are provided as three-way/two-position directional control valves hydraulically connecting the wheel brakes (31–34), when in idle position, with the braking pressure generator (1) and, upon switching over, with the auxiliary pressure supply system (23, 26) with a third pressure medium path in each case being locked.

2. The brake system as defined in claim 1, wherein the braking pressure generator (1) comprises a single-type or tandem master cylinder with a positioning device comprising a piston guided in the master cylinder (2) and a pressure chamber into which, as the slip control action starts, pressure medium can be fed in by way of the auxiliary pressure control valve (23), thus permitting the working pistons (6,7) of the master cylinder (2) to be stopped or returned to a predetermined position.

3. The brake system as defined in claim 2, wherein the pressure connection or pressure medium conduit (40) of the auxiliary pressure supply system (23, 26) communicates with the pressure compensating reservoir (20) by way of an electromagnetically actuatable two-way/two-position directional control valve (47) which is locked when idle and can be switched over to open passage.

4. The brake system as defined in claim 3, wherein between the control conduit (48) of the auxiliary pressure control valve (23) and the pressure connection or pressure medium conduit (40) of the auxiliary pressure supply system (23, 26) a differential pressure recognition device (43) is inserted which electrically and/or hydraulically generates an output signal indicating the pressure differential, which signal can be evaluated for monitoring, for signaling defects, and/or for cutting off the slip control upon occurrence of a fault.

* * * * *